(12) United States Patent  
Maurer

(10) Patent No.: US 8,301,283 B2  
(45) Date of Patent: Oct. 30, 2012

(54) METHOD FOR OUTPUTTING AUDIO-VISUAL MEDIA CONTENTS ON A MOBILE ELECTRONIC DEVICE, AND MOBILE ELECTRONIC DEVICE

(75) Inventor: Martin Maurer, Fuerstenfeldbruck (DE)

(73) Assignee: Intel Mobile Communications GmbH, Neubiberg (DE)

( * ) Notice: Subject to any disclaimer, the term of this patent is extended or adjusted under 35 U.S.C. 154(b) by 573 days.

(21) Appl. No.: 12/545,094

(22) Filed: Aug. 21, 2009

(65) Prior Publication Data

US 2010/0049348 A1 Feb. 25, 2010

(30) Foreign Application Priority Data

Aug. 21, 2008 (DE) .......................... 10 2008 038 586

(51) Int. Cl.
*G06F 17/00* (2006.01)

(52) U.S. Cl. ......................................................... 700/94
(58) Field of Classification Search .................... 700/94; 704/500–504; 455/3.06
See application file for complete search history.

(56) References Cited

U.S. PATENT DOCUMENTS

| 7,126,770 | B1 * | 10/2006 | Arai et al. .......................... 360/8 |
| 7,522,964 | B2 | 4/2009 | Du et al. |
| 7,526,349 | B2 | 4/2009 | Chan et al. |
| 2002/0069746 | A1 * | 6/2002 | Taira et al. ....................... 84/609 |
| 2005/0190199 | A1 * | 9/2005 | Brown et al. ................... 345/600 |
| 2008/0181313 | A1 * | 7/2008 | Kim ............................ 375/240.28 |

FOREIGN PATENT DOCUMENTS

DE 60130262 T2 6/2008

* cited by examiner

*Primary Examiner* — Andrew C Flanders

(57) ABSTRACT

A method for outputting audio-visual media contents on a mobile electronic device is provided. The method may include receiving a request for the output of an audio-visual media content which is stored in a compressed format in a memory in a mobile electronic device; checking of whether a copy of the requested media content is stored in an uncompressed format in a nonvolatile memory in the device; and outputting the stored copy of the requested media content instead of the requested media content if a copy of the requested media content is stored in an uncompressed format in the nonvolatile memory in the device.

18 Claims, 3 Drawing Sheets

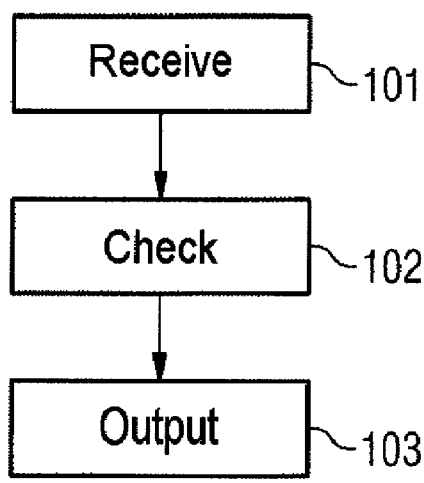
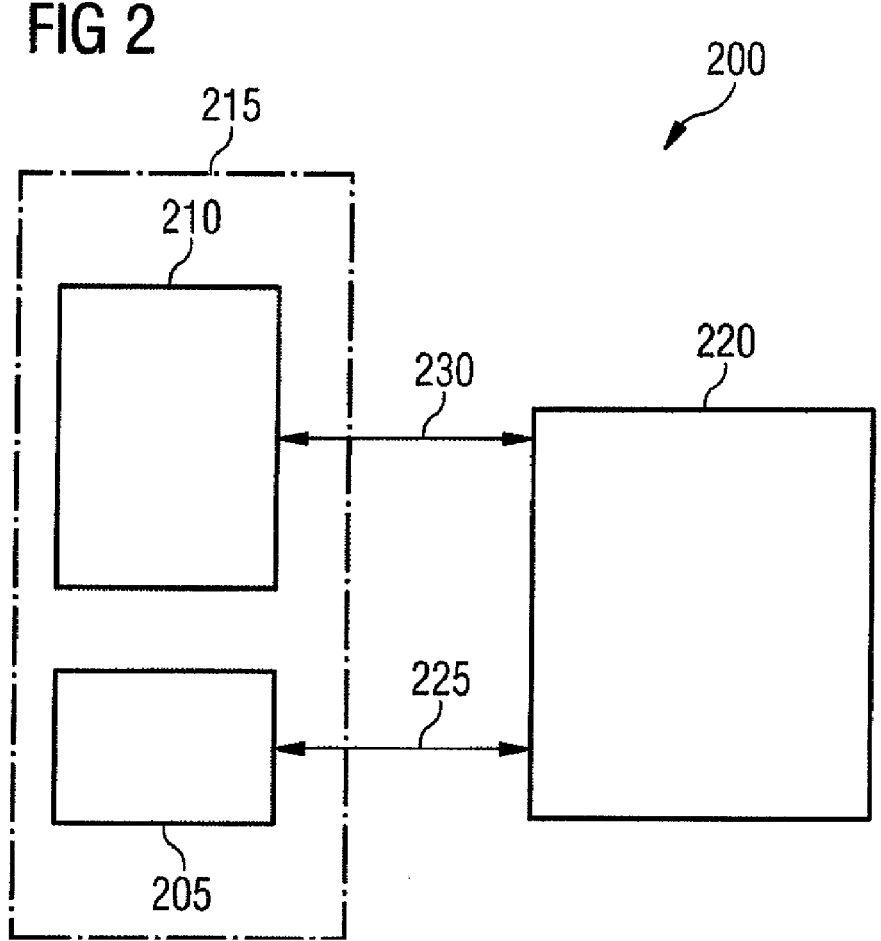

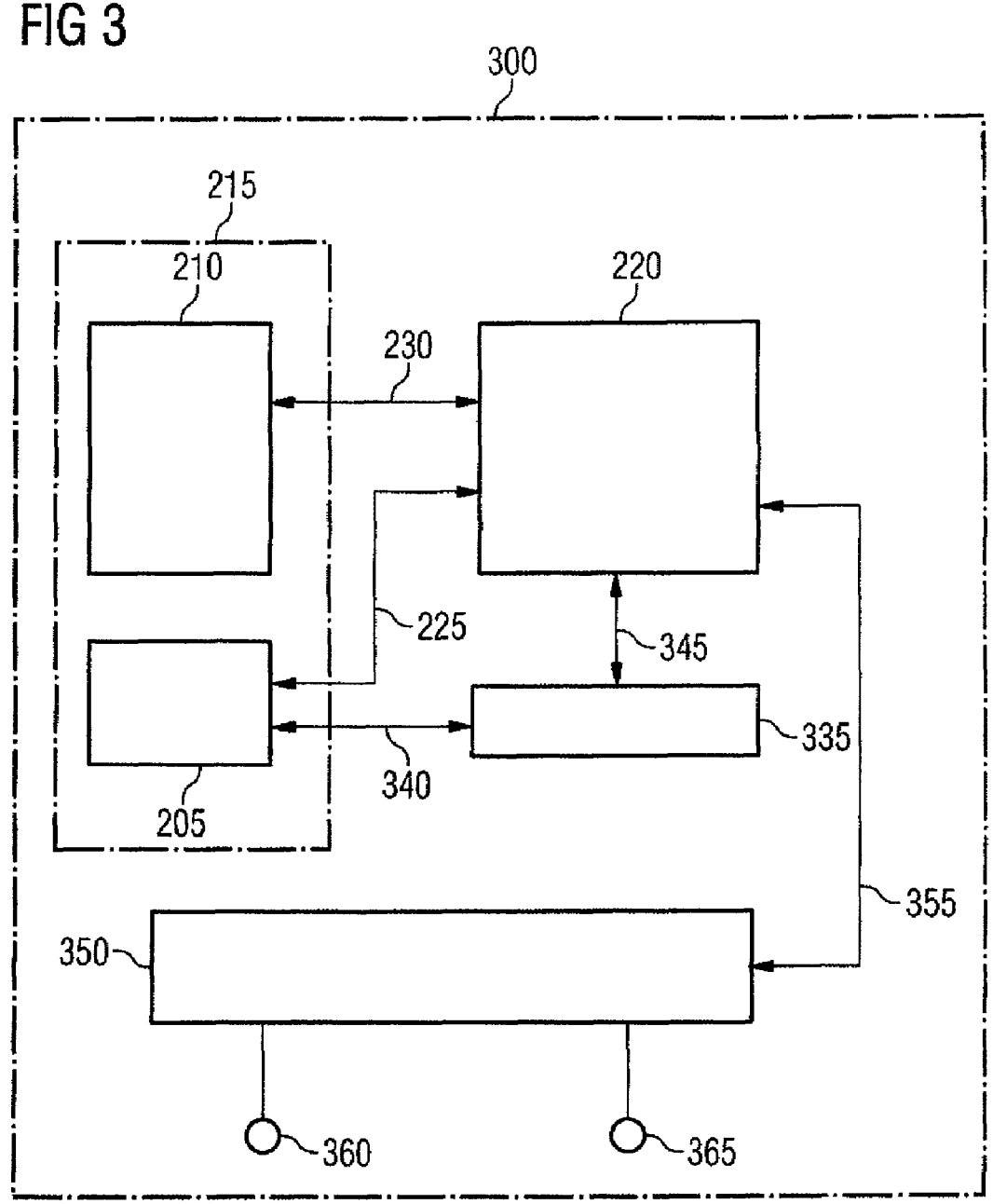

METHOD FOR OUTPUTTING AUDIO-VISUAL MEDIA CONTENTS ON A MOBILE ELECTRONIC DEVICE, AND MOBILE ELECTRONIC DEVICE

CROSS-REFERENCE TO RELATED APPLICATION

This application claims priority to German Patent Application Serial No. 10 2008 038 586.7, which was filed Aug. 21, 2008, and is incorporated herein by reference in its entirety.

TECHNICAL FIELD

Various embodiments relate to a method for outputting audio-visual media contents on a mobile electronic device, and to a mobile electronic device.

BACKGROUND

Mobile electronic devices today frequently provide the option of presenting audio-visual media contents to a user. By way of example, a user can listen to pieces of music or watch video sequences. Such media contents are, particularly for mobile use, frequently stored digitally in a compressed format in the mobile device. This makes more efficient use of the usually much smaller data memory of a mobile device in comparison with static applications.

In mobile electronic devices, it is generally desirable to achieve long operating times for the batteries or storage batteries required for the mobile supply of current. Users of portable music players, video players and mobile telephones can, by virtue of the efficiency of today's compression methods, carry very extensive media contents with them virtually everywhere and wish to be able to consume the greatest possible portions thereof without the disturbance of battery changes or storage battery recharging.

SUMMARY OF THE INVENTION

In an embodiment, a method for outputting audio-visual media contents on a mobile electronic device is provided. The method may include: receiving a request for the output of an audio-visual media content which is stored in a compressed format in a memory in a mobile electronic device; checking of whether a copy of the requested media content is stored in an uncompressed format in a nonvolatile memory in the device; and outputting the stored copy of the requested media content instead of the requested media content if a copy of the requested media content is stored in an uncompressed format in a nonvolatile memory in the device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a flowchart for a method in accordance with an embodiment;

FIG. 2 shows a block diagram for a mobile electronic device in accordance with an embodiment;

FIG. 3 shows a block diagram for a mobile electronic device in accordance with another embodiment with more details;

DESCRIPTION

Figure 4:
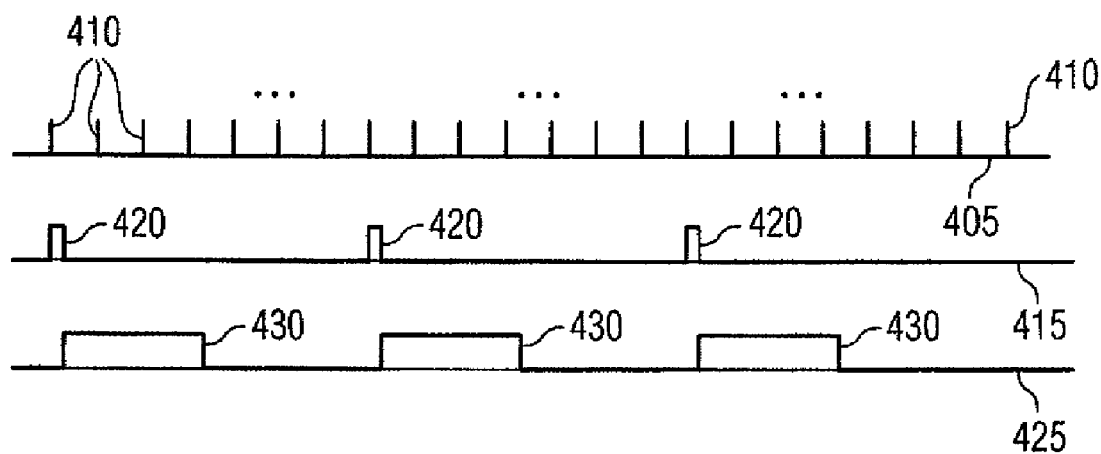
FIG. 4 shows the timing for the reproduction of a media content stored in a compressed format in accordance with an embodiment.

The following detailed description refers to the accompanying drawings that show, by way of illustration, specific details and embodiments in which the invention may be practiced. These embodiments are described in sufficient detail to enable those skilled in the art to practice the invention. In this regard, directional terminology, such as "top", "bottom", "front", "back", "leading", "trailing", etc, is used with reference to the orientation of the Figure(s) being described. Because components of embodiments can be positioned in a number of different orientations, the directional terminology is used for purposes of illustration and is in no way limiting. Other embodiments may be utilized and structural, logical, and electrical changes may be made without departing from the scope of the invention. The various embodiments are not necessarily mutually exclusive, as some embodiments can be combined with one or more other embodiments to form new embodiments. The following detailed description therefore, is not to be taken in a limiting sense, and the scope of the present invention is defined by the appended claims.

The word "exemplary" is used herein to mean "serving as an example, instance, or illustration". Any embodiment or design described herein as "exemplary" is not necessarily to be construed as preferred or advantageous over other embodiments or designs.

Various embodiments may reduce the power consumption in a mobile electronic device during the reproduction of media contents which are stored in compressed format.

With reference to FIG. 1, the text below describes a method for outputting audio-visual media contents on a mobile electronic device in accordance with an embodiment.

In 101, a request is received for the output of an audio-visual media content which is stored in a compressed format in a memory in a mobile electronic device. By way of example, the request can be produced by an input by a user who wishes to have the relevant media content reproduced for him. The request may also be an device-internal request, for example, which a unit in the device uses to ask another unit in the device to output the relevant media content. The request can be received by a processor, for example a microprocessor, which is executing the method.

In 102, a check is performed to determine whether a copy of the requested media content is stored in an uncompressed format in a nonvolatile memory in the device. It is ascertained whether the requested media content is available only in the compressed format or is also available in the uncompressed format. The media content is available in the uncompressed format if it is already stored in a memory in the device in this format and does not first of all need to be produced by decompressing the media content stored in a compressed format.

In 103, the stored copy of the requested media content is output instead of the requested media content if a copy of the requested media content is stored in an uncompressed format in a nonvolatile memory in the device. In other words, an available copy in an uncompressed format is thus output with priority ahead of the media content stored in a compressed format. In other words, the request for the direct output of a compressed media content is diverted to the output of the uncompressed copy of the media content if such a copy is available. The media content is originally stored in the form of digital data in the nonvolatile memory. The data are read from the memory and then output. By way of example, the output can take place by sending the data to a digital/analog converter. The output signals from the digital/analog converter can then be used to actuate an amplifier, a loudspeaker or a set of headphones, for example, in order to reproduce the relevant media content. A screen can be actuated in order to visually reproduce the relevant media content.

FIG. 2 shows a block diagram of a mobile electronic device 200 in accordance with an embodiment. The device has a memory 205, which is configured to store an audio-visual media content in a compressed format. It also has a nonvolatile memory 210, which is configured to store a copy of the media content in an uncompressed format. The memory 205 may likewise be a nonvolatile memory. The two memories 205 and 210 may be separate units or circuits or may be components of an integrated memory arrangement. The two memories 205 and 210 may also be in the form of components or areas of a single memory 215.

The compressed and the uncompressed media contents can be stored together in the memory 215 at arbitrary locations. They are then possibly not explicitly associated with separate components or separate areas of the memory 215. In this case, the memories 205 and 210 relate conceptually to the areas of the memory 215 which can be determined by the respective memory location of the compressed and uncompressed data.

The mobile electronic device 200 also has a controller 220, which is configured to receive a request for the output of the media content which is stored in the compressed format. The controller 220 is also configured to check whether a copy of the requested media content is stored in the uncompressed format in the nonvolatile memory 210, and is configured to output the stored copy of the requested media content instead of the requested media content if a copy of the requested media content is stored in the uncompressed format in the nonvolatile memory 210.

By way of example, the controller 220 is a microprocessor which can use data and control lines 225 to access the memory 205 and can use data and control lines 230 to access the nonvolatile memory 210. Input and output ports—not shown here—can be used by the controller 220 to receive the request and to output the copy of the requested media content. The functions of the controller 220 can also be performed by virtue of a plurality of the components of the device 200 interacting.

With reference to FIG. 3, the text below describes a block diagram of a mobile electronic device 300 in accordance with another embodiment in more detail. In this case, the same reference symbols as in FIG. 2 are used for elements which have the same or similar properties as the elements already described with reference to FIG. 2.

In similar fashion to the device 200, the device 300 has a memory 205 and a nonvolatile memory 210 which can be implemented as areas of a single memory 215. In addition, the device 300 has a controller 220 which is coupled to the memories 205 and 210 by means of respective data and control lines 225 and 230.

In this embodiment, the controller 220 may also be configured to store the media content as a copy in the uncompressed format in the nonvolatile memory 210. To this end, the uncompressed media content can be received from outside the device 300, for example. Alternatively, it can be obtained by decompressing the media content which is already available in compressed form in the memory 205. In addition, the media content to be stored as an uncompressed copy can be obtained by decompressing a compressed media content received externally.

The device 300 may have a decompressor 335 which is coupled to the memory 205 by data and control lines 340 and which is coupled to the controller 220 by data and control lines 345. The decompressor 335 may receive a compressed media content from the controller 220, for example, or from the memory 205 or (not shown in this case) via a data bus from other units or circuits or externally. It decompresses the data received, that it to say it converts the data from a compressed format into an uncompressed format. The uncompressed media content obtained in this manner can then be transmitted to the controller 220 via the data and control lines 345. By way of example, the decompressor 335 can be implemented by an appropriately programmed microprocessor or by a piece of decompression hardware. The decompressor may also be contained in the controller. The decompressor and the controller may be in the form of respective processes which run on one and the same microprocessor. The decompressed or uncompressed data can be output to an output channel, for example audio or video, or can be stored in the nonvolatile, in other words permanent, memory 210.

The device 300 also has a power supply unit or circuit 350 configured to supply the device with electric current. The power supply unit or circuit 350 supplies the respective required operating voltages and operating currents to the units, circuit processors, memories, integrated circuits, input and output units etc. of the device 300 via appropriate electrical lines (not shown here). Signal lines 355 can be used by the controller 220 to monitor and control the states and the operation of the power supply unit or circuit 350.

The power supply unit or circuit 350 may be connected to a connection 360 for a battery for battery operation, that is to say in order to use a battery as the source of power. It is also connected to a connection 365 for an external supply of electric current, that is to say in order to use the external current source as the source of power. The connections 360 and 365 may respectively be in the form of a single-terminal connection in combination with an ulterior ground connection for the device 300 or in the form of independent two-terminal connections. The battery used can be either a non-rechargeable battery or a rechargeable battery, that is to say a storage battery. The connection 360 may also be a permanent connection, for example a solder connection for a soldered-in battery or a soldered-in storage battery. The connection 365 can produce an external supply of power, for example via a charging cable or a plug-in power supply unit, a USB connection or an Ethernet connection. A storage battery may remain connected to the connection 360 during external supply of power and can be recharged via said connection.

The controller 220 checks the state of the charging logic, that is to say the power supply unit or circuit 350, and establishes whether the device draws power externally or is supplied with power solely by the storage battery. The output of uncompressed media contents which are stored in the memory 210 is also permitted during battery or storage-battery operation. The decompression of a requested compressed media content is permitted in battery operation only if no uncompressed copy of the requested media content is available.

As a good example, the controller 220 is an inspection entity which inspects the decompression, in other words the decoding, and playback of content data and in so doing checks whether a content which is to be played back is in compressed form or in uncompressed form and in this case preferably prompts playback of a content which is to be played back in the uncompressed version. The content data may be pieces of music or video films, for example, which are stored in the memory 205 or in the memory 215 in compressed form, for example in the MP3 format, and which are stored in the nonvolatile memory 210 or the memory 215 in uncompressed form, for example in the WAV format. To distinguish between compressed files and uncompressed files, a "flag" (digital marker) can be used, for example, or the files may be stored in separate portions of the memory which are intended for this purpose. If a content which is to be output, in other words a content which is to be reproduced or played back, is present both as a file in compressed form and as a file in uncompressed form, the uncompressed version of the content which is to be played back is preferably output during battery or storage-battery operation. In this case, the decompression unit 335 does not need to be switched on, the power consumption is reduced and the storage-battery operating time is increased.

During a time phase with an external supply of power, for example when the mobile electronic device 300 is temporarily in static operation, low power consumption may be less important. During such a time phase, the controller 220 may allow or prompt a media content to be stored as a copy in the uncompressed format in the nonvolatile memory 210. In this case, the content data can be obtained externally or can be obtained by decompressing compressed content data, stored in the memory 205, using the decompressor 335. As a result, a copy of the content, stored in the nonvolatile memory 210, is available in a compressed format for later battery operation. When the relevant content is later requested for output, the uncompressed version can be output, which reduces the power consumption in storage-battery mode.

Since the memory space available in the nonvolatile memory 210 is limited, it may generally not be possible to keep a copy in an uncompressed format in the nonvolatile memory 210 available for every media content which is stored in compressed format in the memory 205. The controller 220 takes at least one prescribed or prescribable criterion as a basis for deciding whether or not the storage as a copy and the decompression of a media content need to take place in a time phase of external supply of power. The criterion may be a priority criterion. In respect of reducing the battery power consumption, it may be particularly inexpensive to hold frequently requested media contents available as an uncompressed copy stored in the nonvolatile memory 210. By way of example, the controller 220 creates and inspects a list of favorites about content data which are to be played back, checks the free memory space available in the memory 210 and decides about the decompression and storage as a copy during a time phase with an external supply of power. Criteria for creating the list and for forming an order in the list may be the frequency with which a content begins to be played or is played back, the setting of the favorites property by a user of the device and the classification of a media content as content which will frequently be required in future (for example a key acknowledgement tone, a wakeup signal, a background image, a screensaver or a ringing tone).

If the device 300 draws its operating power via the external power supply and there is sufficient free memory space in the memory 210, the respective topmost content file from the favorites list, that is to say that file which has been determined as the file for the most economical power saving, is decompressed and is stored in the memory 210 in uncompressed form. Optionally, the charge state of a storage battery which is to be charged in parallel can also be taken into account, that is to say the decompression and storage as an uncompressed copy are not prompted if the storage battery state is still inadequate. This means that there is a larger proportion of the externally supplied power available for charging the storage battery, and charging is speeded up.

Provision may be made for the storage of a new compressed file in the memory 205 to prompt a check to determine whether there is sufficient free space available in the memory 210 for storing a copy of this file in uncompressed form. If this is not the case, provision may be made for an uncompressed file belonging to a different content with a lower rank on the favorites list to be erased from the memory 210 in order to create free memory space for storing a copy of the new compressed file in uncompressed form.

In line with one embodiment, memory space in the memory 210 which is occupied by the data from a media content stored as an uncompressed copy is released without any action and without any prior confirmation by a user of the device. A memory area occupied by such a copy can be erased, overwritten or marked as free in line with the priorities of the favorites list, for example. If a compressed media content stored in the memory 205 is erased, for example because a user or the operating system erases the relevant file, provision may be made for the relevant decompressed contents in the memory 210 also to be erased. The stored copy in the memory 210 is erased without further prior confirmation by a user of the device.

A portion of the functionality—described in preceding embodiments—of the controller 220 or of the decompressor 335 can be relocated to an external device, for example a personal computer (PC), which is connected to the device 300 by means of a data link, for example by cable or by radio. The external device can execute, by way of example, the reading of a current favorites list, decompression of compressed data (if a personal computer decompresses at higher speed than the decompressor 335, for example), the loading of compressed content data into the memory 205, the loading of decompressed content data into the memory 210, the synchronization of a file with a piece of state information regarding whether the contents are in compressed or uncompressed form, and the calculation of a free or available memory space.

In line with one embodiment, the controller 220 may be configured to check whether a content file in compressed form has properties as part of "digital rights management" DRM which do not allow storage as a decompressed file.

The reduction in the power consumption when reproducing uncompressed contents in comparison with reproducing compressed contents is explained in more detail below with reference to FIG. 4 and FIG. 5. By way of example, the reproduction of pieces of music which are stored in the known compression format MP3 in a mobile radio telephone which has this functionality is considered. These considerations also relate to other compressed files, formats and reproduction units, for example including video players.

Such mobile devices frequently have a flash memory, for example with a capacity of 4, 8 or 16 GB, or a hard disk with a capacity of 80 or 160 GB as a nonvolatile memory. Such a nonvolatile memory permanently stores not only various other data but also compressed media contents. The term "permanent" relates to the fact that the data, once input, are retained even without a supply voltage. However, the data can also be erased and the same or other data can be stored again at the relevant storage location. An audio content compressed in MP3 format at a data rate of 128 kbit/s, for example a piece of music, requires approximately 1 MB of memory space. Uncompressed, that is to say in the WAV format known from personal computers, for example, the same audio content requires memory space which is approximately ten times greater.

FIG. 4 shows the timing when outputting an audio content stored with compression in the MP3 format. 405 is a time line for the time cycles of the audio data. For each of the times 410, there is a digital value which describes the audio signal. A typical sampling rate for digital audio signals is 44 kHz, for example. The time line 415 describes the reading of the data from the flash memory. In each of the time phases 420, a series of data required in the future is read from the memory. The time line 425 describes the decompression, in other words decoding, of the data which are read from the flash memory in the time phases 420. During the time phases 430, the decompressor 335 is active and decompresses the compressed data read in the respective previous reading phase 420. In the process shown, the compressed MP3 data are read from a flash memory in blocks and are then decompressed in blocks. The decompressed data are then sent to a digital/analog converter, for example using a timer-controlled interrupt routine. The output signals from said digital/analog converter are forwarded to an amplifier, loudspeaker or headphones.

Figure 5:
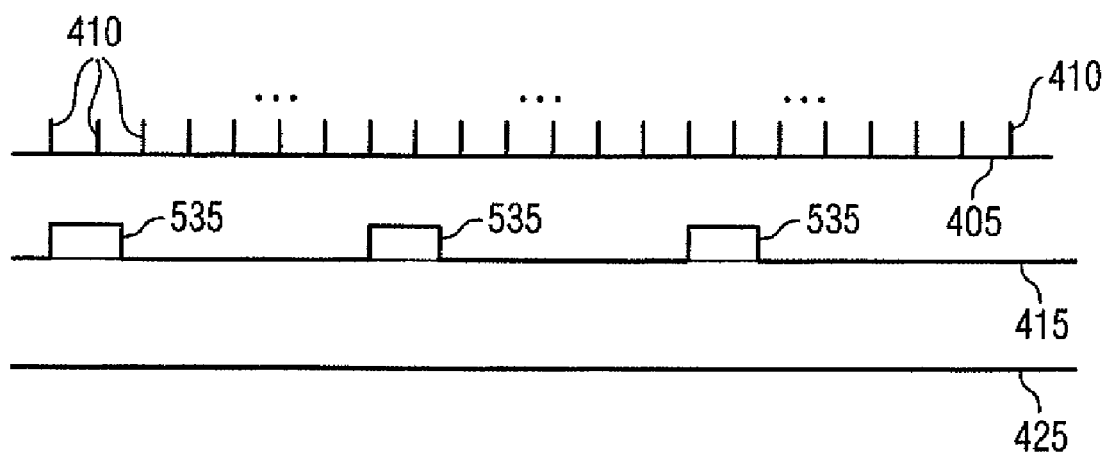
FIG. 5 shows the timing for the reproduction of a media content stored in an uncompressed format in accordance with an embodiment.

FIG. 5 shows the timing for the output of an uncompressed copy of the audio contents from FIG. 4. In this case, the same or similar elements are denoted by the same reference symbols as in FIG. 4. 405 is the time line for the digital clocking of the audio signal, 415 is the time line for the reading from the flash memory and 425 is the time line for the decompression. Digital data in the audio signal are respectively available at the times 410. The time phases 535 denote the reading of the uncompressed data from the flash memory. On account of the relatively large volume of data in the uncompressed format in comparison with the compressed format, this reading takes correspondingly longer. Decompression is not necessary in this case, however. The time line 425 therefore has no activity phases for the decompressor 335. The reduction in the power consumption which is obtained when the decompressor 335 does not need to be turned on outweighs the increase in the power consumption as a result of the longer-lasting reading of the uncompressed data from the memory.

It should be emphasized that FIG. 4 and FIG. 5 do not show the time axes to scale, and particularly the length of periods on the time line 415 is not necessarily shown to the same scale as the length of periods on the time line 425. FIG. 4 and FIG. 5 serve to illustrate the principle and are not necessarily suitable for a quantitative comparison of the various periods shown.

In an embodiment, a method for outputting audio-visual media contents on a mobile electronic device is provided. The method may include: receiving a request for the output of an audio-visual media content which is stored in a compressed format in a memory in a mobile electronic device; checking of whether a copy of the requested media content is stored in an uncompressed format in a nonvolatile memory in the device; and outputting the stored copy of the requested media content instead of the requested media content if a copy of the requested media content is stored in an uncompressed format in a nonvolatile memory in the device.

Expressed in terms of a good example, a reproduction request directed at the stored compressed version of an audio-visual media content may be diverted to the uncompressed version of this media content if such a version is already present in stored form. The relevant media content is then output on the basis of the data available stored in the uncompressed format in the nonvolatile memory instead of the data available stored in the compressed format. This has the advantage that otherwise necessary decompression of the compressed data before output can be dispensed with. This reduces the power consumption of the mobile electronic device when the media content is reproduced.

A saving in terms of power consumption may be obtained in an embodiment according to which the received request involves an audio-visual media content, which is stored in a compressed format in a memory in a mobile electronic device, being decompressed by means of a software algorithm and then output. In the case of decompression by means of a software algorithm, the decompression is not performed by means of a piece of specialized hardware, for example what is known as a hardware codec ("codec" means coder/decoder), but rather a piece of software, for example a software codec, is executed by a processor and effects the decompression. In other words, a decompression algorithm is executed which is available in the form of a piece of software which is loaded into a processor for the purpose of execution.

The term "uncompressed" may be understood as the opposite of the term "compressed" and may mean that compression of the content in the manner in which it appears in the compressed format does not appear in the uncompressed format. In other words, an uncompressed content may be an uncompressed or as yet uncompressed content or may be a content which has been produced by decompressing a content which previously appeared in compressed form. By way of example, a media content is compressed in order to reduce the volume of data required for storing it and thus to be able to make more efficient use of a data memory. Mobile electronic devices today frequently provide the option of presenting audio-visual media contents to a user. By way of example, a user can listen to pieces of music or watch video sequences. Such media contents are, particularly for mobile use, frequently stored digitally in a compressed format in the mobile device. This makes more efficient use of the usually much smaller data memory in a mobile device in comparison with static devices. The reduction in the volume of data which is possible using compression methods today is a factor of ten or more, for example, i.e. a reduction to 10% or less, without an average user noticing a reduction in the reproduction quality of a piece of music or of a video sequence.

Suitable audio-visual media content is all contents which can be stored as data and can be presented to a user or content consumer in audio-visual or similar fashion or reproduced for a user or content consumer. By way of example, the audio-visual reproduction can relate to sound, still pictures, photographs, moving pictures, video, graphics, script or any combinations of these. Examples of audio-visual media contents are pieces of music, video films, slideshows (slide presentations), transparency presentations, books, ringtones, computer graphics and computer games.

A nonvolatile memory can be used to store not only various other data but also compressed or uncompressed media contents permanently. The terms "nonvolatile" and "permanent" relate to the fact that data, once input, are retained even without a supply voltage. However, the data could also be erased and the same or other data can be freshly stored at the relevant storage location.

In line with one embodiment, a mobile electronic device may have a memory, configured to store an audio-visual media content in a compressed format, a nonvolatile memory, configured to store a copy of the media content in an uncompressed format. It also may have a controller, configured to receive a request for the output of the media content which is stored in the compressed format, also configured to check whether a copy of the requested media content is stored in the uncompressed format in the nonvolatile memory and configured to output the stored copy of the requested media content instead of the requested media content if a copy of the requested media content is stored in the uncompressed format in the nonvolatile memory.

In line with one embodiment, the media content may be stored as a copy in the uncompressed format in the nonvolatile memory. This may have the effect that the probability may be increased of a copy of a requested media content being stored in an uncompressed format in a nonvolatile memory in the device.

In line with one embodiment, the media content may be decompressed prior to the storing as a copy. This may have the effect that a media content initially appearing in the compressed form can be stored as a copy in the uncompressed format in the nonvolatile memory.

In line with one embodiment, the device can be supplied with electric current either through battery operation or through external supply of power, wherein the storing as a copy and the decompressing may take place during the external supply of power and the outputting may take place during battery operation. In line with one embodiment, the device may have a connection for a battery for battery operation and a connection for an external supply of electric current and can be configured to allow the storing as a copy and the decompressing during the external supply of power and to allow the outputting during battery operation. These embodiments each may have the effect that the storing as a copy and the decompressing take place without consuming current from the battery or the storage battery, and the battery operating time is therefore not adversely affected thereby. By contrast, the power-saving outputting of the uncompressed copy, which is less of a load on the battery operating time than decompressing or outputting a compressed content, can also take place in battery operation or mobile operation. The term "battery" in this application is intended to denote e.g. either a nonrechargeable battery or a rechargeable battery (a storage battery).

In line with one embodiment, at least one prescribed or prescribable criterion may be taken as a basis for deciding whether the storing as a copy and the decompressing need to take place. The prescribed or prescribable criterion may be a priority criterion. For different audio-visual media contents, a priority respectively associated therewith can be taken as a basis for deciding whether or not the storing as a copy and the decompressing need to take place.

In line with one embodiment, a request may be received for the provision of a free memory area in the nonvolatile memory. A memory area occupied by the stored copy may be provided as a free memory area.

In line with one embodiment, a memory area occupied by the stored copy may be overwritten with other data without prior confirmation by a user of the device.

In line with one embodiment, the stored copy may be erased without prior confirmation by a user of the device if the media content which is stored in the compressed format is erased.

In line with one exemplary embodiment, the compressed format may be one of the following formats: MP3, MP3-PRO, AC-3, AAC, WMA, MPEG (video), H.264, JPEG, JPEG 2000, ZIP, OGG, RAR, GZ. However, it is also possible to use other formats—not explicitly mentioned in this application—as a compressed format.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for outputting audio-visual media contents on a mobile electronic device, the method comprising:
   receiving a request for the output of an audio-visual media content which is stored in a compressed format in a memory in a mobile electronic device;
   checking of whether a copy of the requested media content is stored in an uncompressed format in a nonvolatile memory in the device;
   checking of whether the device is being supplied with electric current through a battery operation or through external supply of power,
   allowing outputting the stored copy of the requested media content in the uncompressed format instead of the requested media content stored in the compressed format if the copy of the requested media content is stored in the uncompressed format in the nonvolatile memory in the device and if the device is in battery operation or external power operation, and
   allowing decompressing and outputting the requested media content stored in the compressed format if the device is in external power supply operation.

2. The method as claimed in claim 1, further comprising:
   storing the media content as a copy in the uncompressed format in the nonvolatile memory.

3. The method as claimed in claim 2, further comprising:
   decompressing the media content prior to the storing as a copy.

4. The method as claimed in claim 1,
   wherein the device can be supplied with electric current either through battery operation or through external supply of power, and wherein the storing as a copy and the decompressing take place during the external supply of power and the outputting takes place during battery operation.

5. The method as claimed in claim 2, further comprising:
   deciding, on the basis of at least one prescribed criterion, about whether the storing as a copy and the decompression need to take place.

6. The method as claimed in claim 1, further comprising:
   receiving a request for the provision of a free memory area in the nonvolatile memory; and
   providing a memory area occupied by the stored copy as a free memory area.

7. The method as claimed in claim 1, further comprising:
   overwriting a memory area occupied by the stored copy with other data without prior confirmation by a user of the device.

8. The method as claimed in claim 1, further comprising:
   erasing the stored copy without prior confirmation by a user of the device if the media content which is stored in the compressed format is erased.

9. The method as claimed in claim 1,
   wherein the compressed format is a compressed format selected from a group consisting of: MP3, MP3-PRO, AC-3, AAC, WMA, MPEG (video), H.264, JPEG, JPEG 2000, ZIP, OGG, RAR, and GZ.

10. A mobile electronic device, comprising:
    a memory configured to store an audio-visual media content in a compressed format;
    a nonvolatile memory configured to store a copy of the media content in an uncompressed format;
    a controller configured to receive a request for the output of the media content which is stored in the compressed format, further configured to check whether a copy of the requested media content is stored in the uncompressed format in the nonvolatile memory in the device, further configured to check whether the device is being supplied with electric current through a battery operation or through external supply of power, further configured to allow outputting the stored copy of the requested media content in the uncompressed format instead of the requested media content stored in the compressed format if the copy of the requested media content is stored in the uncompressed format in the nonvolatile memory and if the device is in battery operation or external power operation, and further configured to allow decompressing and outputting the requested media content stored in the compressed format if the device is in external power supply operation.

11. The mobile electronic device as claimed in claim 10, wherein the controller is configured to store the media content as a copy in the uncompressed format in the nonvolatile memory.

12. The mobile electronic device as claimed in claim 11, further comprising:
a decompressor configured to decompress the media content before the storage as a copy.

13. The mobile electronic device as claimed in claim 10, further comprising:
a connection for a battery for battery operation and a connection for an external supply of electric current, wherein the device is configured to allow the storing as a copy and the decompressing during the external supply of power and to allow the outputting during battery operation.

14. The mobile electronic device as claimed in claim 11, wherein the controller is configured to decide, on the basis of at least one prescribed criterion, whether the storing as a copy and the decompressing need to take place.

15. The mobile electronic device as claimed in claim 10, wherein the controller is configured to receive a request for the provision of a free memory area in the nonvolatile memory and is configured to provide a memory area occupied by the stored copy as a free memory area.

16. The mobile electronic device as claimed in claim 10, wherein the controller is configured to overwrite a memory area occupied by the stored copy with other data without prior confirmation by a user of the device.

17. The mobile electronic device as claimed in claim 10, wherein the controller is configured to erase the stored copy without prior confirmation by a user of the device if the media content which is stored in the compressed format is erased.

18. The mobile electronic device as claimed in claim 10, wherein the compressed format is a compressed format selected from a group consisting of: MP3, MP3-PRO, AC-3, AAC, WMA, MPEG (video), H.264, JPEG, JPEG 2000, ZIP, OGG, RAR, and GZ.

* * * * *